US011869424B2

(12) United States Patent
Liu et al.

(10) Patent No.: US 11,869,424 B2
(45) Date of Patent: Jan. 9, 2024

(54) PIXEL DRIVING CIRCUIT, PIXEL STRUCTURE, AND DISPLAY PANEL

(71) Applicant: BOE TECHNOLOGY GROUP CO., LTD., Beijing (CN)

(72) Inventors: Libin Liu, Beijing (CN); Yu Feng, Beijing (CN); Shiming Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 280 days.

(21) Appl. No.: 17/415,758

(22) PCT Filed: Dec. 29, 2020

(86) PCT No.: PCT/CN2020/140891

§ 371 (c)(1),
(2) Date: Jun. 18, 2021

(87) PCT Pub. No.: WO2021/164431

PCT Pub. Date: Aug. 26, 2021

(65) Prior Publication Data

US 2022/0327997 A1 Oct. 13, 2022

(30) Foreign Application Priority Data

Feb. 20, 2020 (CN) ......................... 202010103609.7

(51) Int. Cl.
*G09G 3/3233* (2016.01)

(52) U.S. Cl.
CPC ... *G09G 3/3233* (2013.01); *G09G 2300/0439* (2013.01); *G09G 2300/0819* (2013.01);
(Continued)

(58) Field of Classification Search
CPC ......... G09G 3/3233; G09G 2300/0439; G09G 2300/0819; G09G 2300/0842;
(Continued)

(56) References Cited

U.S. PATENT DOCUMENTS 10,984,723 B1 * 4/2021 Zhou .................... G09G 3/3258
2003/0205973 A1 * 11/2003 Park .................. H10K 59/1213
315/169.1

(Continued)

FOREIGN PATENT DOCUMENTS

CN 1322015 11/2001
CN 1797525 7/2006

(Continued)

OTHER PUBLICATIONS

International Search Repoert from PCT/CN2020/140891 dated Mar. 17, 2021.

(Continued)

*Primary Examiner* — Roberto W Flores
(74) *Attorney, Agent, or Firm* — Calfee, Halter & Griswold LLP

(57) ABSTRACT

The present disclosure relates to the field of display technology, and proposes a pixel driving circuit, a pixel structure, and a display panel. The pixel driving circuit includes a plurality of driving transistors. For each driving transistor the first terminal is connected to a first power terminal, the second terminal is connected to a first node, and the control terminal is connected to a second node, so as to input current to the first node under the effect of the voltage at the second node. The low pixel density area of the display panel can be provided with the above-mentioned pixel driving circuit, so that the brightness difference between the low pixel density area and the high pixel density area can be avoided.

8 Claims, 12 Drawing Sheets

(52) U.S. Cl.
CPC ............... *G09G 2300/0842* (2013.01); *G09G 2320/0233* (2013.01)

(58) Field of Classification Search
CPC ... G09G 2320/0233; G09G 2300/0426; G09G 2300/0861; G09G 2340/0407; H10K 59/1213; H10K 59/123
See application file for complete search history.

(56) References Cited

U.S. PATENT DOCUMENTS

| | | | | |
|---|---|---|---|---|
| 2004/0246209 | A1 | 12/2004 | Sung | |
| 2015/0187267 | A1* | 7/2015 | Park | G09G 3/3233 345/77 |
| 2020/0152134 | A1* | 5/2020 | Lee | G09G 3/20 |
| 2020/0388220 | A1 | 12/2020 | Xu et al. | |
| 2020/0410926 | A1* | 12/2020 | Li | G09G 3/325 |

FOREIGN PATENT DOCUMENTS

| | | |
|---|---|---|
| CN | 107342050 | 11/2017 |
| CN | 109754744 | 5/2019 |
| CN | 110379350 | 10/2019 |
| CN | 110390900 | 10/2019 |
| CN | 10400542 | 11/2019 |
| CN | 111292687 | 6/2020 |
| JP | 2003114644 | 4/2003 |
| JP | 4540903 | 9/2010 |
| WO | 2019196925 | 10/2019 |
| WO | 20190196925 | 10/2019 |

OTHER PUBLICATIONS

Written Opinion from PCT/CN2020/140891 dated Mar. 17, 2021.
Office action from Chinese Application No. 202010103609.7 dated Nov. 9, 2020.
Office action from Chinese Application No. 202010103609.7 dated Jul. 14, 2021.

* cited by examiner

PIXEL DRIVING CIRCUIT, PIXEL STRUCTURE, AND DISPLAY PANEL

CROSS-REFERENCE TO RELATED APPLICATION

The present application is a 35 U.S.C. 371 national phase application of PCT International Application No. PCT/CN2020/140891 filed on Dec. 29, 2020, and claims the priority of the Chinese patent application No. 202010103609.7 filed on Feb. 20, 2020 and titled by "Pixel Driving Circuit, Pixel Structure, and Display Panel", the entire disclosure of both are incorporated herein as a part of the present application for all purposes.

TECHNICAL FIELD

The present disclosure relates to the field of display technology, and in particular to a pixel driving circuit, a pixel structure, and a display panel.

BACKGROUND

In the related art, in order to realize a full-screen design of a display device such as a mobile phone, the camera of the display device such as a mobile phone is usually hidden in the display area of the display panel. The pixel density of the display area with the camera hidden needs to be set to be smaller than the pixel density of the normal display area, so as to increase its light transmittance, for facilitating the camera to collect light from the object to be photographed.

However, since the low pixel density area where the camera is hidden and the high pixel density area for normal display have different pixel densities, the high pixel density area and the low pixel density area of the display panel will have different display brightnesses when displaying an image.

It should be noted that the information disclosed in the background art section above is only used to enhance the understanding of the background of the present disclosure, and therefore may include information that does not constitute the prior art known to those of ordinary skill in the art.

SUMMARY

According to an aspect of the present disclosure, there is provided a pixel driving circuit including a plurality of driving transistors. Each driving transistor has a first terminal connected to a first power terminal, a second terminal connected to a first node, and a control terminal connected to a second node, so as to input current to the first node under the effect of the voltage at the second node.

In an exemplary embodiment of the present disclosure, the pixel driving circuit further includes: a first switch circuit, a data writing circuit, a compensation circuit, a second switch circuit, a storage circuit, a first reset circuit, a second reset circuit, and a light-emitting unit. The first switch circuit is connected to the first power terminal, the first terminal of each driving transistor, and an enable signal terminal, and is configured to achieve conduction between the first power terminal and the first terminal of each driving transistor in response to the signal at the enable signal terminal. The data writing circuit is connected to the first terminal of each driving transistor, a data signal terminal, and a gate signal terminal, and is configured to transfer the signal at the data signal terminal to the first terminal of each driving transistor in response to the signal at the gate signal terminal. The compensation circuit is connected to the first node, the second node, and the gate signal terminal, and is used to achieve conduction between the first node and the second node in response to the signal at the gate signal terminal. The second switch circuit is connected to the first node, the enable signal terminal, and the third node, and is used to transmit the signal at the second node to the third node in response to the signal at the enable signal terminal. The storage circuit is connected between the second node and the first power terminal, and is used to store the voltage at the second node. The first reset circuit is connected to the second node, an initial signal terminal, and a reset signal terminal, and is used to transmit the signal at initial signal terminal to the second node in response to the signal at the reset signal terminal. The second reset circuit is connected to the third node, the initial signal terminal, and the reset signal terminal, and is used to transmit the signal at the initial signal terminal to the third node in response to the signal at the reset signal terminal. The light-emitting unit is connected between the third node and the second power terminal.

In an exemplary embodiment of the present disclosure, the first switch circuit includes a first transistor, which has the first terminal connected to the first power terminal, the second terminal connected to the first terminal of each driving transistor, and the control terminal connected to the enable signal terminal. The data writing circuit includes a second transistor, which has the first terminal connected to the data signal terminal, the second terminal connected to the first terminal of each driving transistor, and the control terminal connected to the gate signal terminal. The compensation circuit includes a third transistor, which has the first terminal connected to the first node, the second terminal connected to the second node, and the control terminal connected to the gate signal terminal. The second switch circuit includes a fourth transistor, which has the first terminal connected to the first node, the second terminal connected to the third node, and the control terminal connected to the enable signal terminal. The storage circuit includes a capacitor, and the capacitor is connected between the second node and the first power terminal. The first reset circuit includes a fifth transistor, which has the first terminal connected to the second node, the second terminal connected to the initial signal terminal, and the control terminal connected to the reset signal terminal. The second reset circuit includes a sixth transistor, which has the first terminal connected to the third node, the second terminal connected to the initial signal terminal, and the control terminal connected to the reset signal terminal. The light-emitting unit includes a light-emitting diode, and the light-emitting diode is connected between the third node and the second power terminal.

In an exemplary embodiment of the present disclosure, the pixel driving circuit further includes a seventh transistor, an eighth transistor, a capacitor, and a light-emitting unit. The seventh transistor has the first terminal connected to the data signal terminal, the second terminal connected to the second node, and the control terminal connected to the first gate signal terminal. The eighth transistor has the first terminal connected to a sensing signal terminal, the second terminal connected to the first node, and the control terminal connected to the second gate signal terminal. The capacitor is connected between the first node and the second node. The light-emitting unit is connected between the first node and the second power terminal.

According to an aspect of the present disclosure, there is provided a pixel structure including the above-mentioned pixel driving circuit.

In an exemplary embodiment of the present disclosure, the pixel driving circuit includes a capacitor, each driving transistor includes a gate portion, and a plurality of the gate portions together form an electrode of the capacitor.

In an exemplary embodiment of the present disclosure, the pixel structure includes a gate layer, a source-drain layer, and a conductive layer located between the gate layer and the source-drain layer, wherein part of the conductive layer forms another electrode of the capacitor.

In an exemplary embodiment of the present disclosure, the pixel structure includes a data line extending along a first direction, and the plurality of driving transistors are sequentially arranged in parallel along the first direction.

According to an aspect of the present disclosure, there is provided a display panel including a low pixel density area and a high pixel density area, wherein the low pixel density area is provided with the above-mentioned pixel driving circuit.

According to an exemplary embodiment of the present disclosure, in the display area of the display panel, the pixel density of the high pixel density area is n times the pixel density of the low pixel density area, and the pixel driving circuit in the high pixel density area has the same architecture as the pixel driving circuit in the low pixel density area. Besides, the pixel driving circuit in the high pixel density area includes in driving transistors, and the pixel driving circuit in the low pixel density area includes X driving transistors, where in is a positive integer, and X is a positive integer less than or equal to $n^2m$ and greater than $n^2m-1$, or X is a positive integer greater than or equal to $n^2m$ and less than $n^2m+1$. In the high pixel density area, the capacitor in the pixel driving circuit has a capacitance value of p. In the low pixel density area, the capacitor in the pixel driving circuit has a capacitance value of $n^2p$. Also, the driving transistor in the high pixel density area has the same size as the driving transistor in the low pixel density area.

In an exemplary embodiment of the present disclosure, in the high pixel density area, the pixel driving circuit includes a driving transistor.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the present disclosure, and are used together with the specification to explain the principle of the present disclosure. Obviously, the drawings in the following description are only some embodiments of the present disclosure. For those of ordinary skill in the art, other drawings can be obtained based on these drawings without creative work.

DETAILED DESCRIPTION OF THE EMBODIMENTS

Figure 1:
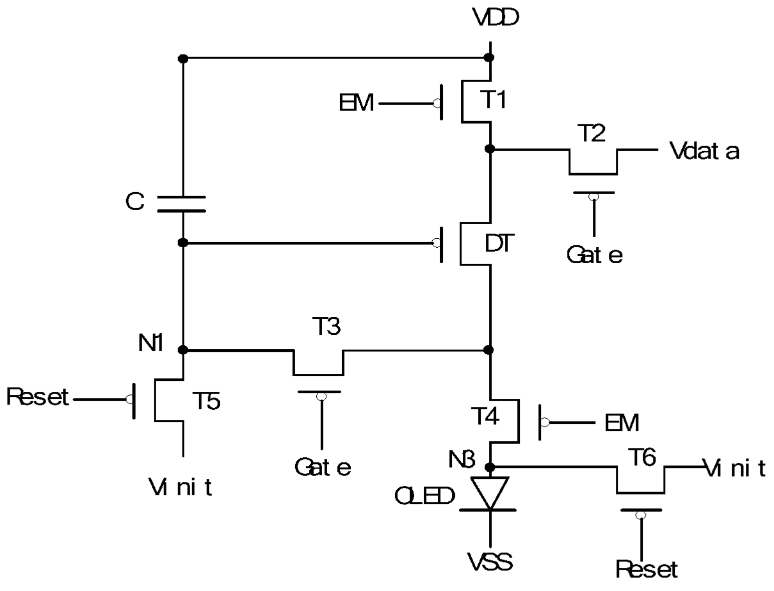
FIG. 1 is a schematic structural diagram of a pixel driving circuit in the related art.

Example embodiments will now be described more fully with reference to the accompanying drawings. However, the example embodiments can be implemented in various forms, and should not be construed as being limited to the examples set forth herein. On the contrary, the provision of these embodiments makes the present disclosure more comprehensive and complete, and fully conveys the concept of the example embodiments to those skilled in the art. The described features, structures or characteristics can be combined in one or more embodiments in any suitable way. In the following description, many specific details are provided to give a sufficient understanding of embodiments of the present disclosure. However, those skilled in the art will realize that the technical solutions of the present disclosure can be practiced without one or more of the specific details, and other methods, components, devices, steps, etc. can be used. In other cases, the well-known technical solutions are not shown or described in detail, in order to avoid overwhelming the crowd and obscure all aspects of the present disclosure.

In addition, the drawings are only schematic illustrations of the present disclosure, and are not necessarily drawn to scale. The same reference numerals in the figures denote the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

The terms "a", "an", "the" and "said" are used to indicate the presence of one or more elements/components/etc. The terms "include" and "have" are used to indicate open-ended inclusion. It means that there may be other elements/components/etc. apart from the listed elements/components/etc. The terms “first” and “second” etc. are only used as marks, not to limit the quantity of the relevant objects.

In order to achieve a full-screen design of display devices such as mobile phones, related technologies usually hide the cameras of display devices such as mobile phones in the display area of the display panel. The display area where the camera is hidden needs to set its pixel density to be smaller than the pixel density of the normal display area, so as to increase its light transmittance. This is beneficial for the camera to collect light from the object to be photographed. However, since the low pixel density area where the camera is hidden and the high pixel density area for normal display have different pixel densities, the high pixel density area and the low pixel density area will have different display brightnesses when the display panel displays an image.

Figure 2:
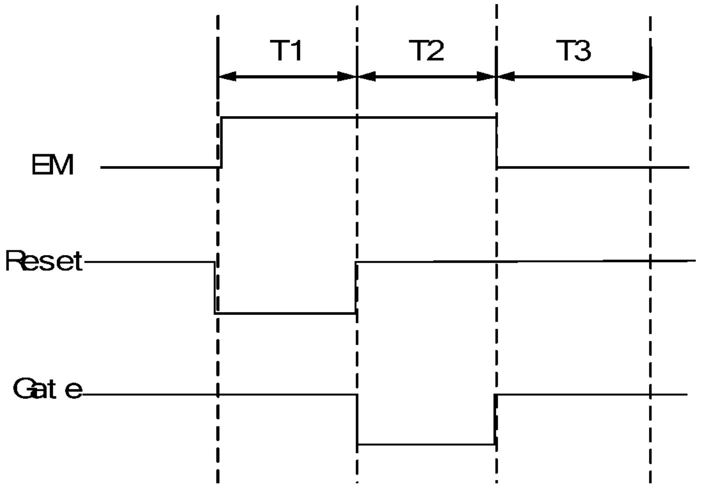
FIG. 2 is a timing diagram of some nodes in the pixel driving circuit of FIG.

As shown in FIGS. 1 and 2, FIG. 1 is a schematic structural diagram of a pixel driving circuit in the related art, and FIG. 2 is a timing diagram of some nodes in the pixel driving circuit of FIG. 1. The pixel driving circuit includes first to sixth transistors T1-T6, a driving transistor DT, a capacitor C, and a light-emitting unit OLED. The first to sixth transistors T1-T6 and the driving transistor DT can all be P-type transistors, and the light-emitting unit OLED is connected between the third node and the second power terminal VSS. The driving method of the pixel driving circuit includes three phases: a reset phase, a compensation phase, and a light-emitting phase. As shown in FIG. 2, in the reset phase T1, the enable signal terminal EM receives a high level signal; the reset signal terminal Reset receives a low level signal; the gate driving signal terminal Gate receives a high level signal; the fifth transistor T5 and the six transistor T6 are turned on; the first transistor T1, the second transistor T2, the third transistor T3, and the fourth transistor T4 are turned off; and the initial signal terminal Vinit inputs a reset signal to the first node N1 and the third node N3. In the compensation phase T2, the enable signal terminal EM receives a high level signal; the reset signal terminal Reset receives a high level signal; the gate driving signal terminal Gate receives a low level signal; the first transistor T1, the fourth transistor T4, the fifth transistor T5 and the sixth transistor T6 are turned off; the second transistor T2 and the third transistor T3 are turned on; and the data signal terminal Vdata inputs the compensation voltage V to the first node N1, wherein the compensation voltage V=Vdata+Vth, Vdata is the signal voltage at the data signal terminal Vdata, and Vth is the threshold voltage at the third transistor T3. In the light-emitting phase, the enable signal terminal EM receives a low level signal; the reset signal terminal Reset receives a high level signal; the gate driving signal terminal Gate receives a high level signal; the second transistor T2, the third transistor T3, the fifth transistor T5 and the sixth transistor T6 are turned off; the first transistor T1 and the fourth transistor T4 are turned on; and the light-emitting unit OLED emits light under the control of the output current from the driving transistor DT. In the above embodiment, the output current from the driving transistor DT is $I=0.5*W/L*Cox*(Vgs-Vth)^2$, where Vg is the gate voltage of the driving transistor DT, Vs is the source voltage of the driving transistor DT, Vth is the threshold voltage of the driving transistor DT, W is the channel width of the driving transistor DT, L is the channel length of the driving transistor DT, and Cox is the capacitance per unit area of the gate of the driving transistor. Then, the output current from the driving transistor DT is $I=0.5*W/L*Cox*(Vgs-Vth)^2=0$ $0.5*W/L*Cox*(Vdata+Vth-VDD-Vth)^2=0.5*W/L*Cox*(Vdata-VDD)^2$. It can be seen from the above formula that the light-emitting state of the light-emitting unit OLED is not related to the threshold voltage of the driving transistor, so as to avoid the influence of the threshold voltage of the driving transistor DT on the light-emitting brightness.

Figure 3:
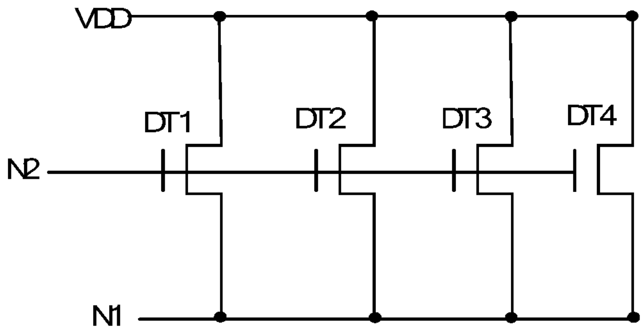
FIG. 3 is a schematic structural diagram of the pixel driving circuit according to an exemplary embodiment of the present disclosure.

Based on the above, the exemplary embodiment provides a pixel driving circuit, as shown in FIG. 3, which is a schematic structural diagram of the pixel driving circuit according to an exemplary embodiment of the present disclosure. The pixel driving circuit includes a plurality of driving transistors DT1, DT2, DT3, and DT4. Each driving transistor has the first terminal connected to the first power terminal VDD, the second terminal connected to the first node N1, and the control terminal connected to the second node N2, so as to input current to the first node N1 under the effect of the voltage at the second node N2.

In an exemplary embodiment, the first node may be connected to the light-emitting unit for providing driving current to the light-emitting unit. Using the pixel driving circuit, the current input to the first node N1 is increased by providing multiple driving transistors, without changing the size of the driving transistor and the voltage at the first power terminal VDD, thereby improving the brightness of the light-emitting unit.

In an exemplary embodiment, as shown in FIG. 3, four driving transistors are exemplarily drawn in this embodiment. It should be understood that, in other exemplary embodiments, the pixel driving circuit may also be provided with other numbers of driving transistors. The driving transistor in FIG. 3 may be a P-type transistor or an N-type transistor.

Figure 4:
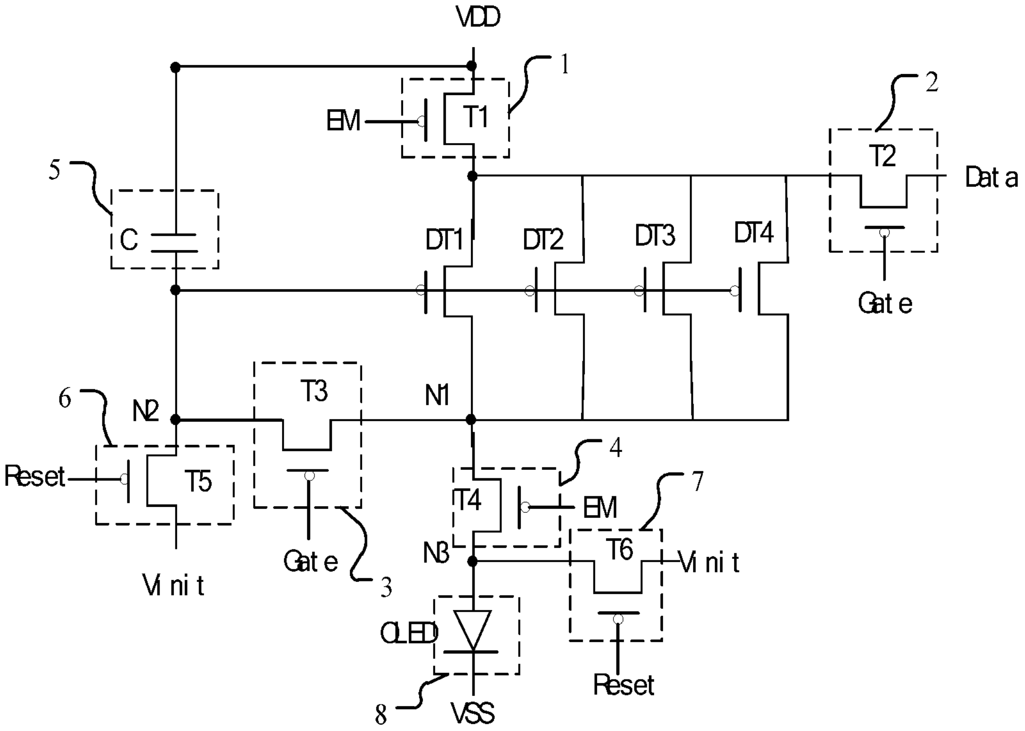
FIG. 4 is a schematic structural diagram of the pixel driving circuit according to another exemplary embodiment of the present disclosure.

As shown in FIG. 4, it is a schematic structural diagram of the pixel driving circuit according to another exemplary embodiment of the present disclosure. In an exemplary embodiment, the pixel driving circuit may further include: a first switch circuit 1, a data writing circuit 2, a compensation circuit 3, a second switch circuit 4, a storage circuit 5, a first reset circuit 6, a second reset circuit 7, and a light-emitting unit 8. The first switch circuit 1 is connected to the first power terminal VDD, the first terminal of each driving transistor, and the enable signal terminal EM, and is used to achieve conduction between the first power terminal VDD and the first terminal of each driving transistor in response to the signal at the enable signal terminal. The data writing circuit 2 is connected to the first terminal of each driving transistor, the data signal terminal Data, and the gate signal terminal Gate, for transmitting the signal at the data signal terminal Data to the first terminal of each driving transistor in response to the signal at the gate signal terminal Gate. The compensation circuit 3 is connected to the first node N1, the second node N2, and the gate signal terminal Gate, for achieving conduction between the first node N1 and the second node N2 in response to the signal at the gate signal terminal Gate. The second switch circuit 4 is connected to the first node N1, the enable signal terminal EM, and the third node N3, for transmitting the signal at the first node N1 to the third node N3 in response to the signal at the enable signal terminal EM. The storage circuit 5 is connected between the second node N2 and the first power terminal VDD, and is used to store the voltage at the second node N2. The first reset circuit 6 is connected to the second node N2, the initial signal terminal Vinit, and the reset signal terminal Reset, for transmitting the signal at the initial signal terminal Vinit to the second node N2 in response to the signal at the reset signal terminal Reset. The second reset circuit 7 is connected to the third node N3, the initial signal terminal Vinit, and the reset signal terminal Reset, for transmitting the signal at the initial signal terminal Vinit to the third node N3 in response to the signal at the reset signal terminal Reset. The light-emitting unit 8 is connected between the third node N3 and the second power terminal VSS.

In an exemplary embodiment, as shown in FIG. 4, the first switch circuit 1 may include a first transistor T1, which has a first terminal connected to the first power terminal VDD, a second terminal connected to the first terminal of each driving transistor, and a control terminal connected to the enable signal terminal EM. The data writing circuit 2 may include a second transistor T2, which has the first terminal connected to the data signal terminal Data, the second terminal connected to the first terminal of each driving transistor, and the control terminal connected to the gate signal terminal Gate. The compensation circuit 3 may include a third transistor T3, which has the first terminal connected to the first node N1, the second terminal connected to the second node N2, and the control terminal connected to the gate signal terminal Gate. The second switch circuit 4 may include a fourth transistor T4, which has the first terminal connected to the first node N1, the second terminal connected to the third node N3, and the control terminal connected to the enable signal terminal EM. The storage circuit 5 may include a capacitor C, which is connected between the second node N2 and the first power terminal VDD. The first reset circuit 6 may include a fifth transistor T5, which has the first terminal connected to the second node N2, the second terminal connected to the initial signal terminal Vinit, and the control terminal connected to the reset signal terminal Reset. The second reset circuit 7 may include a sixth transistor T6, which has the first terminal connected to the third node N3, the second terminal connected to the initial signal terminal Vinit and the control terminal connected to the reset signal terminal Reset. The light-emitting unit 8 may include a light-emitting diode OLED, which is connected between the third node N3 and the second power terminal VSS.

In an exemplary embodiment, the first transistor T1 to the sixth transistor T6 and the driving transistor may be P-type transistors. The driving method of the pixel driving circuit shown in FIG. 4 is basically the same as that of the driving circuit shown in FIG. 1, except that the pixel driving circuit in FIG. 4 inputs current to the first node through four driving transistors. Thus, the pixel driving circuit in FIG. 4 can improve the light-emitting brightness of the pixel units, without changing the size of the first power terminal VDD and the driving transistor.

Figure 5:
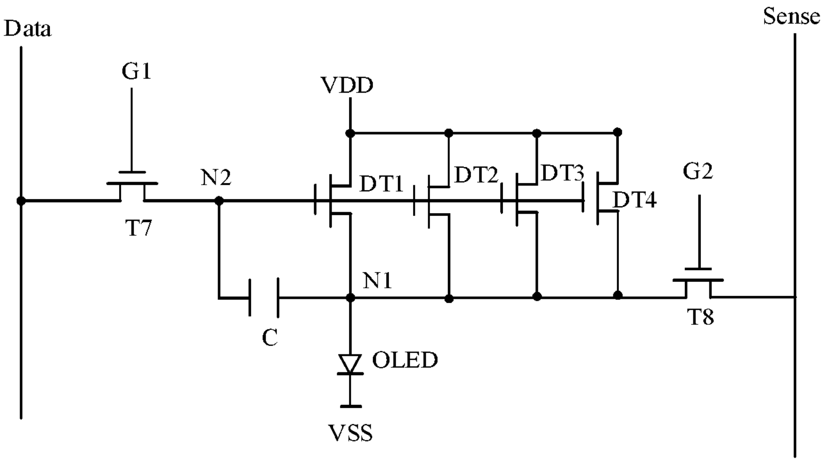
FIG. 5 is a schematic structural diagram of the pixel driving circuit according to another exemplary embodiment of the present disclosure.

It should be understood that in other exemplary embodiments, the pixel driving circuit may also have other structures to choose from. For example, as shown in FIG. 5, it is a schematic structural diagram of a pixel driving circuit according to another exemplary embodiment of the present disclosure. Based on the pixel driving circuit shown in FIG. 3, the pixel driving circuit may further include a seventh transistor T7, an eighth transistor T8, a capacitor C, and a light-emitting unit OLED. With respect to the seventh transistor T7, the first terminal is connected to the data signal terminal Data, the second terminal is connected to the second node N2, and the control terminal is connected to the first gate signal terminal G1. With respect to the eighth transistor T8, the first terminal is connected to the sensing signal terminal Sense, the second terminal is connected to the first node N1, and the control terminal is connected to the second gate signal terminal G2. The capacitor C is connected between the first node N1 and the second node N2. The light-emitting unit is connected between the first node N1 and the second power terminal VSS.

The sensing signal terminal Sense can be used to sense the output current of the driving transistor when the driving transistor is turned on, so as to detect the threshold voltage and mobility of the driving transistor. The driving method of the pixel driving circuit shown in FIG. 5 generally includes a data writing phase and a light emitting phase. In the data writing stage, the data signal terminal Data inputs a data signal to the gate of the driving transistor through the seventh transistor T7 and stores it in the storage capacitor C; at the same time, the sensing signal terminal Sense can also input an initial signal to the source of each driving transistor through the eighth transistor T8. In the light-emitting phase, each driving transistor is turned on under the effect of the storage capacitor C, so as to drive the light-emitting unit OLED to emit light through the first power terminal VDD. In the above case, each driving transistor has an output current $I=w\ (Vg-Vs-Vth)^2$, where w is the mobility of the driving transistor, Vg is the gate voltage of the driving transistor, and Vs is the source voltage of the driving transistor. Since the source and the gate of the driving transistor are connected to both ends of the storage capacitor C, even if the source voltage of the driving transistor rises during the light-emitting phase, the gate of the driving transistor also rises by the same amount under the bootstrap action of the storage capacitor C. That is, the voltage difference between the gate and the source of the driving transistor in the light-emitting phase is equal to the voltage difference between the gate and the source in the data writing phase. Therefore, the brightness of the light-emitting unit can be controlled by merely controlling the data signal terminal Data. Since the pixel driving circuit is provided with a plurality of driving transistors, the light-emitting brightness of the light-emitting unit in the light-emitting phase can be increased.

An exemplary embodiment also provides a pixel structure including the above-mentioned pixel driving circuit.

Figure 6:
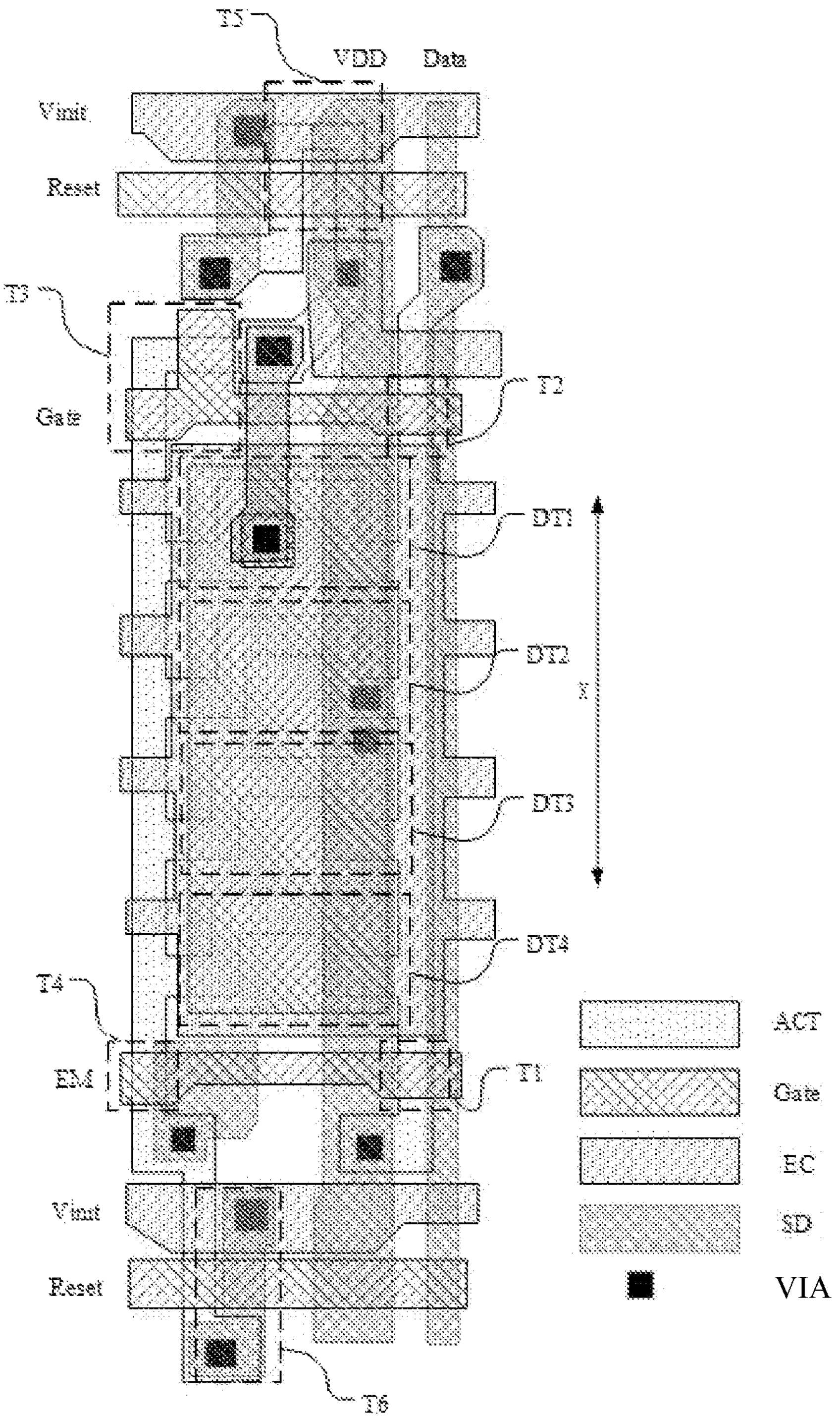
FIG. 6 is a schematic structural diagram of the pixel structure according to an exemplary embodiment of the present disclosure.

As shown in FIG. 6, it is a schematic structural diagram of the pixel structure according to an exemplary embodiment of the present disclosure. FIG. 6 specifically includes the pixel driving circuit shown in FIG. 4. The pixel structure includes an active layer ACT, a gate layer Gate, a conductive layer EC, and a source-drain layer SD, wherein the active layer ACT, the gate layer Gate, the conductive layer EC, and the source-drain layer SD are stacked in sequence, and an insulating layer is provided between adjacent film layers. The annotations Gate, Data, Vinit, Reset, VDD, T1, T2, T3, T4, T5, T6, DT1, DT2, DT3, DT4 in FIG. 6 correspond to the respective ones of the annotations Gate, Data, Vinit, Reset, VDD, T1, T2, T3, T4, T5, T6, DT1, DT2, DT3, DT4 in FIG. 4 respectively. The black squares in FIG. 6 indicate vias located on the insulating layer, and the vias are used to connect the above four film layers.

Figure 7:
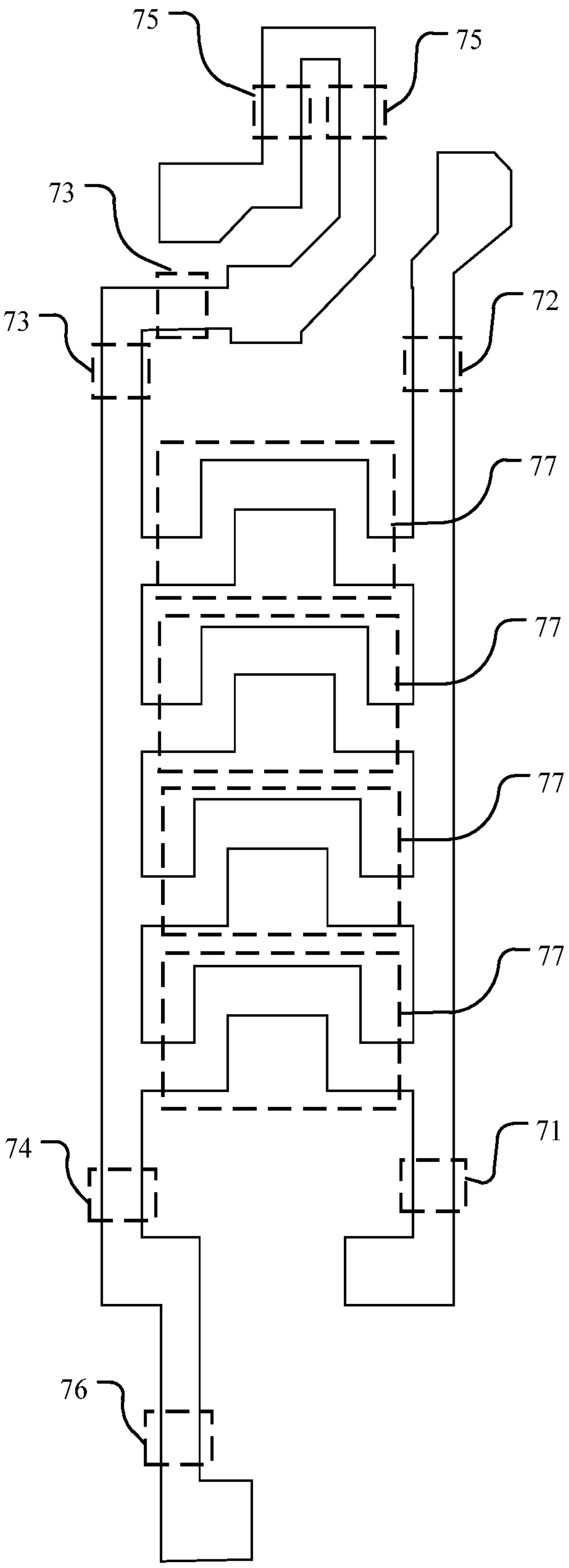
FIG. 7 is a schematic structural diagram of an active layer in the pixel structure according to an exemplary embodiment of the present disclosure.

As shown in FIG. 7, it is a schematic structural diagram of the active layer in the pixel structure according to an exemplary embodiment of the present disclosure. The active layer ACT includes two first active portions 71, two second active portions 72, a third active portion 73, a fourth active portion 74, a fifth active portion 75, a sixth active portion 76, and four seventh active portions 77. To be specific, the first active portion 71 is used to form the channel layer of the first transistor, the second active portion 72 is used to form the channel layer of the second transistor, the two third active portions 73 form the channel layer of the third transistor (double-gate structure), the fourth active portion 74 is used to form the channel layer of the fourth transistor, the two fifth active portions 75 are used to form the channel layer of the fifth transistor (dual-gate structure), the six active portion 76 is used to form the channel layer of the sixth transistor, and the four seventh active portions 77 respectively form the channel layer of the driving transistor.

Figure 8:
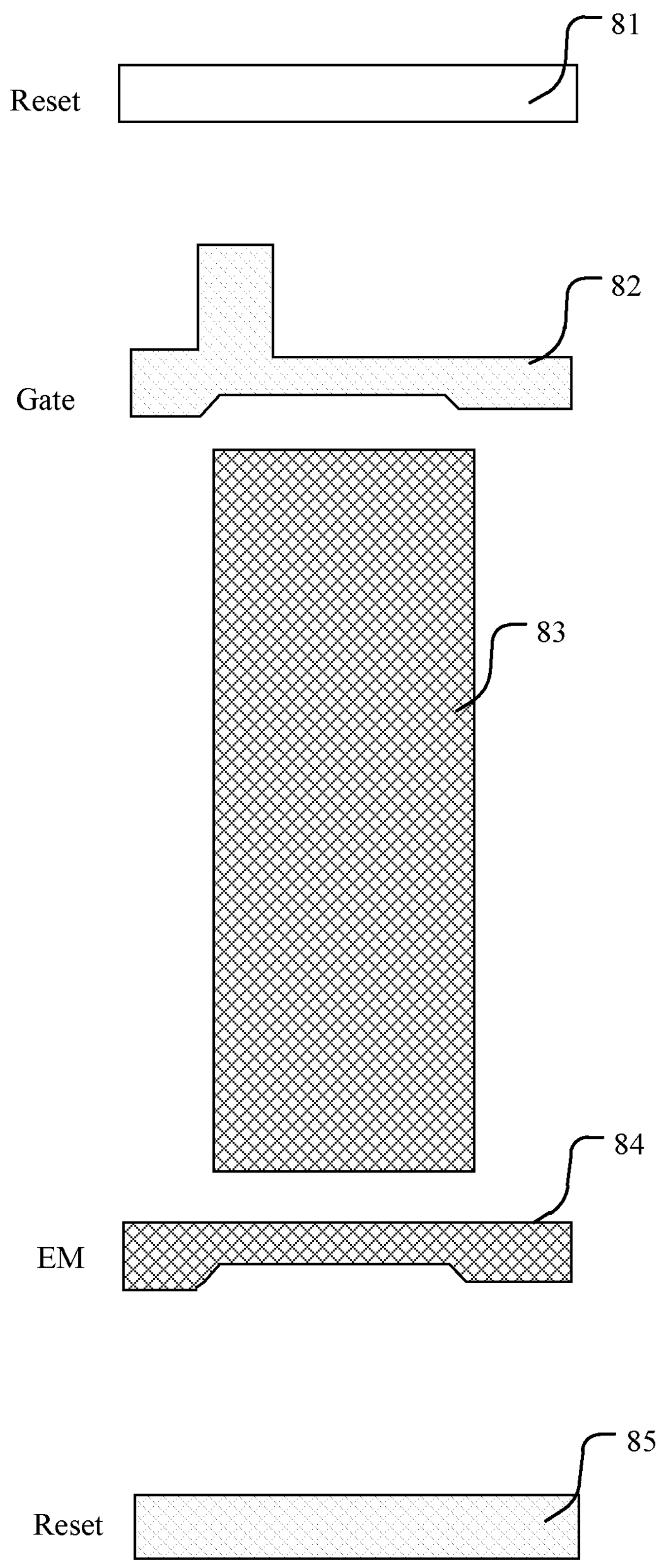
FIG. 8 is a schematic structural diagram of a gate layer in the pixel structure according to an exemplary embodiment of the present disclosure.

As shown in FIG. 8, it is a schematic structural diagram of the gate layer in the pixel structure according to an exemplary embodiment of the present disclosure. The gate layer Gate includes a first gate portion 81, a second gate portion 82, a third gate portion 83, a fourth gate portion 84, and a fifth gate portion 85. To be specific, the orthographic projection of part of the first gate part 81 covers the two fifth active portions 75 to form the gate layer of the fifth transistor T5, while the first gate portion 81 is connected to the reset signal terminal Reset. Part of the second gate portion 82 has an orthographic projection which covers the second active portion 72 to form the gate layer of the second transistor. The orthographic projection of part of the second gate portion 82 covers the third active portion 73 to form the gate layer of the third transistor. At the same time, the second gate portion 82 is connected to the gate driving signal terminal Gate. A part of the third gate portion 83 covers the four seventh active portions to form the gates of the four driving transistors, wherein the third gate portion 83 may be an integral structure, and the third gate portion 83 can form an electrode of the capacitor C in FIG. 4. A part of the fourth gate portion 84 covers the fourth active portion 74 to form the gate of the fourth transistor, and a portion of the fourth gate portion 84 covers the first active portion 71 to form the gate of the first transistor. At the same time, the fourth gate portion 84 is connected to the enable signal terminal EM. Part of the fifth gate portion 85 covers the sixth active portion 76 to form the gate of the sixth transistor T6. At the same time, the fifth gate portion 85 is connected to the reset signal terminal Reset.

Figure 9:
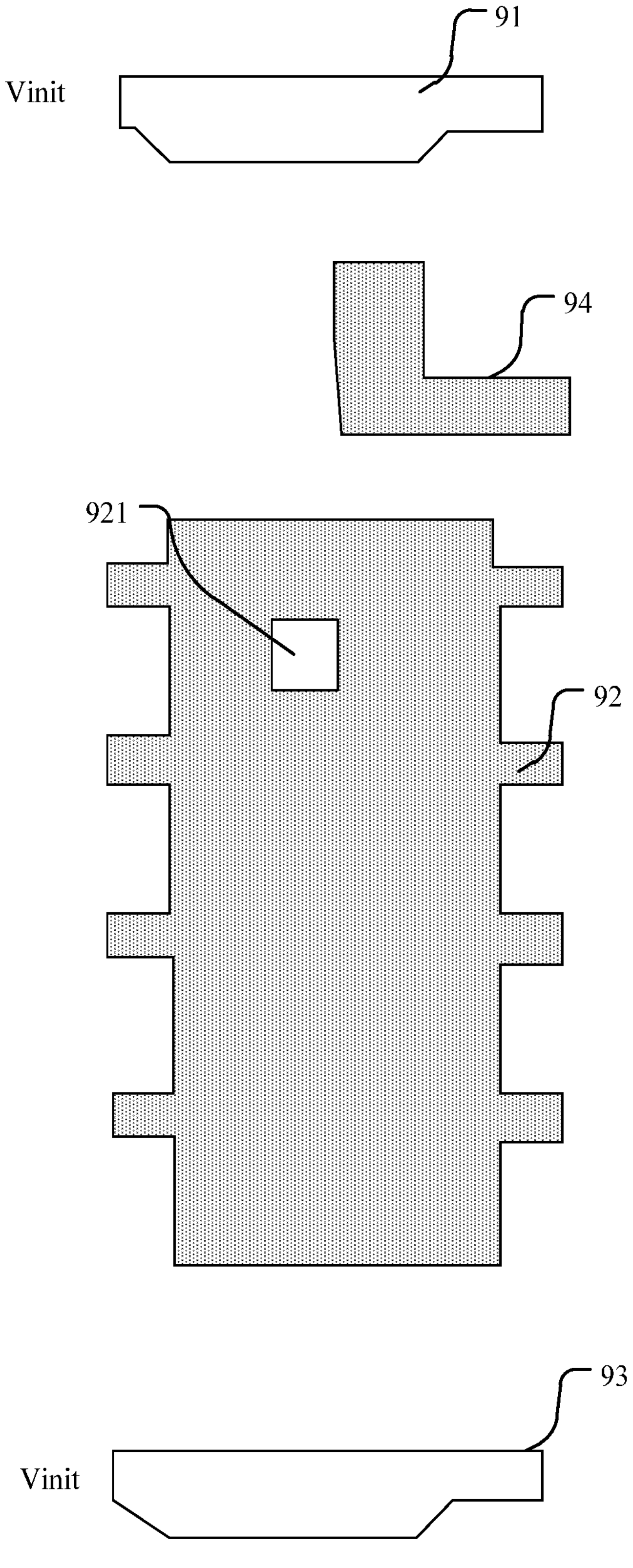
FIG. 9 is a schematic structural diagram of a conductive layer in the pixel structure according to an exemplary embodiment of the present disclosure.

As shown in FIG. 9, it is a schematic structural diagram of the conductive layer in the pixel structure according to an exemplary embodiment of the present disclosure. The conductive layer EC includes a first conductive portion 91, a second conductive portion 92, a third conductive portion 93, and a fourth conductive portion 94. Specifically, the first conductive portion 91 and the third conductive portion 93 can be connected to the initial signal terminal Vinit; the second conductive portion 92 can form another electrode of the capacitor C in FIG. 4; and the fourth conductive portion is used to shield the channel layer of the third transistor T3 in the adjacent pixel structure on the right side, so as to avoid electric leakage of the third transistor.

Figure 10:
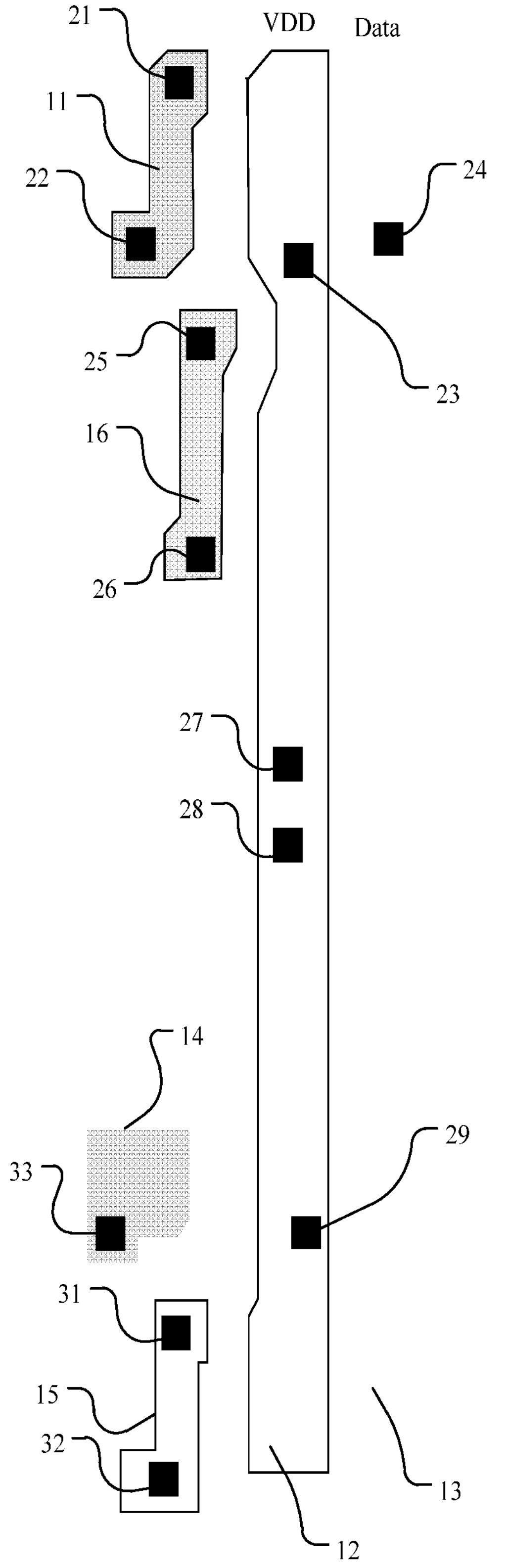
FIG. 10 is a schematic structural diagram of a source-drain layer in the pixel structure according to an exemplary embodiment of the present disclosure.

As shown in FIG. 10, it is a schematic structural diagram of the source-drain layer in the pixel structure according to an exemplary embodiment of the present disclosure. The source-drain layer may include a first source-drain portion 11, a second source-drain portion 12, a third source-drain portion 13, a fourth source-drain portion 14, a fifth source-drain portion 15, and a sixth source-drain portion 16. To be specific, the first source-drain portion 11 is connected to the first conductive portion 91 through the via hole 21, and is connected to the active layer on a side of the fifth active portion 75 through the via hole 22, so as to connect the initial signal terminal Vinit and the second terminal of the fifth transistor. The second source-drain portion 12 is connected to the first power terminal VDD, and is connected to the fourth conductive portion 94 through the via hole 23, so that the fourth conductive portion maintains the voltage of the first power terminal VDD. The second source-drain portion 12 is also connected to the second conductive portion 92 through the via holes 27 and 28, so that the second conductive portion 92 forms an electrode of the capacitor C. The second source-drain portion 12 is also connected to the active layer on a side of the first active portion 71 through the via hole 29, so that the first terminal of the first transistor is connected to the first power terminal VDD. The third source-drain portion 13 is connected to the data signal terminal Data. The third source-drain portion 13 is connected to the active layer on a side of the second active portion 72 through the via hole 24, so that the data signal terminal Data is connected to the first terminal of the second transistor. The fourth source-drain portion 14 is connected to the active layer on a side of the fourth active portion 74 through the via hole 33, so that the fourth source-drain portion 14 is connected to the second terminal of the fourth transistor. The light-emitting diode OLED can be connected to the second terminal of the fourth transistor through the fourth source-drain portion 14. The fifth source-drain portion 15 is connected to the third conductive portion 93 through the via hole 31, and is connected to the active layer on a side of the sixth active portion 76 through the via hole 32, so that the second terminal of the sixth transistor is connected to the initial signal terminal Vinit. The sixth source-drain portion 16 is connected to the active layer on a side of the third active portion 73 through the via hole 25, and is connected to the third gate portion 83 through the via hole 26, so that the gate of each driving transistor is connected to the second terminal of the third transistor. As shown in FIG. 9, the second conductive portion 92 is provided with a hollow hole 921 at the orthographic projection position of the via hole 26, so that the sixth source-drain portion 16 can be connected to the third gate portion 83 through the via hole 26, and is not connected to the second conductive portion 92.

In an exemplary embodiment, the active layer ACT may be indium gallium zinc oxide. After the gate layer is formed, the active layer may be under conductive treatment, so that the non-channel layer in the active layer forms a conductor. To be specific, the conductive treatment can be achieved by hydrogen ion implantation. In addition, the active layer ACT can also be a polysilicon layer. After the gate layer is formed, the active layer can be treated with semiconductor doping, so that the non-channel layer in the active layer forms a conductor, where the semiconductor doping can be N-type semiconductor doping or P-type semiconductor doping. In an exemplary embodiment, the conductive layer EC can also share other conductive film layers in the pixel structure, for example, a light-shielding metal layer.

In an exemplary embodiment, as shown in FIGS. 6 and 10, the pixel structure includes a data line (the third source-drain portion 13), wherein the data line extends in the first direction X, and the plurality of driving transistors is arranged side by side in sequence along the first direction X.

Figure 11:
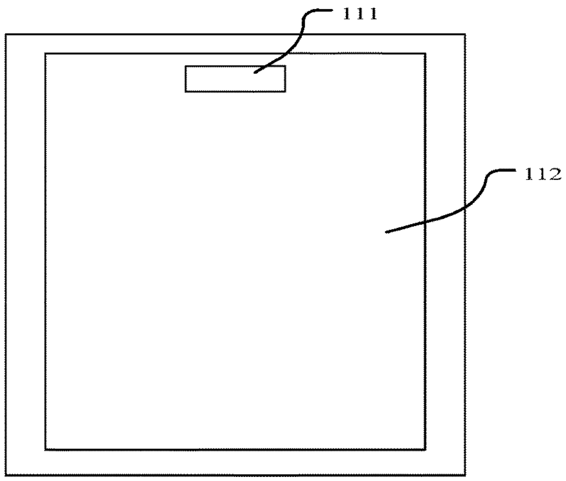
FIG. 11 is a schematic structural diagram of a display panel according to an exemplary embodiment of the present disclosure.

An exemplary embodiment of the present disclosure also provides a display panel, as shown in FIG. 11, which is a schematic structural diagram of an the display panel according to exemplary embodiment of the present disclosure. The display area of the display panel includes a low pixel density area 111 and a high pixel density area 112, wherein the low pixel density area is provided with the aforementioned pixel driving circuit.

In an exemplary embodiment, the pixel density of the high pixel density area is twice the pixel density of the low pixel density area, which is only used as an example for description. The high pixel density area of the display panel may be provided with the pixel driving circuit shown in FIG. 1, and the low pixel density area may be provided with the pixel driving circuit shown in FIG. 4. In the pixel driving circuit shown in FIG. 4, in order to obtain the gate turn-on voltage of the four driving transistors, the capacitance in FIG. 4 should be four times the capacitance value of the capacitor in FIG. 1. Since the number of driving transistors in the pixel driving circuit in FIG. 4 is four times that in FIG. 1, the luminous intensity of the light-emitting unit in FIG. 4 is also approximately four times the luminous intensity of the light-emitting unit in FIG. 1. It can be known through experiments that at this time, the luminous brightness of the high pixel density area and the low pixel density area are similar, and the display area of the display panel is unlikely to have a bright-dark boundary line.

In an exemplary embodiment, by arranging the above-mentioned pixel driving circuit in the low pixel density area, the luminous brightness of the pixel unit in the low pixel density area is enhanced, without changing the size of the driving transistor and the voltage at the first power terminal of the pixel driving circuit, thereby avoiding the phenomenon that the display brightness is inconsistent in the high pixel density area and the low pixel density area of the display panel.

Figure 12:
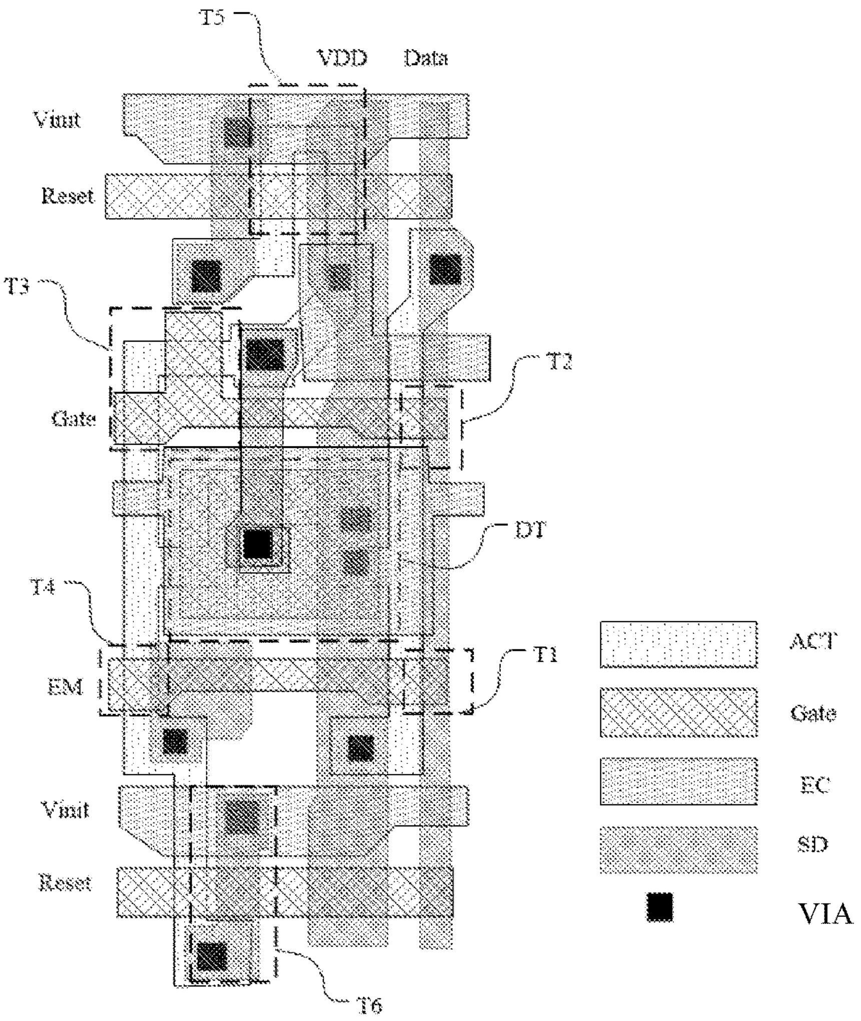
FIG. 12 is a pixel structure corresponding to the pixel driving circuit of FIG.
Figure 13:
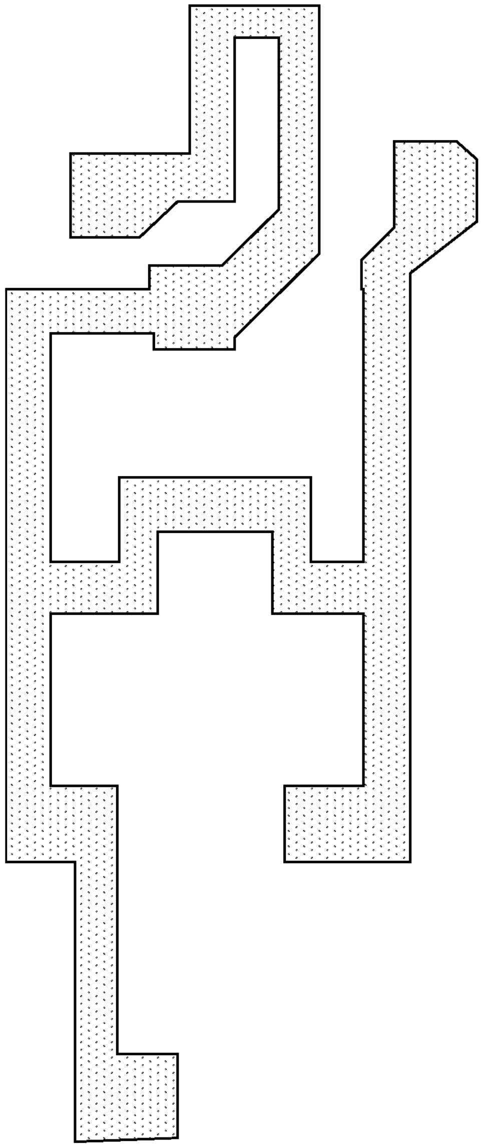
FIG. 13 is a schematic structural diagram of an active layer in the pixel structure of FIG. 12.
Figure 14:
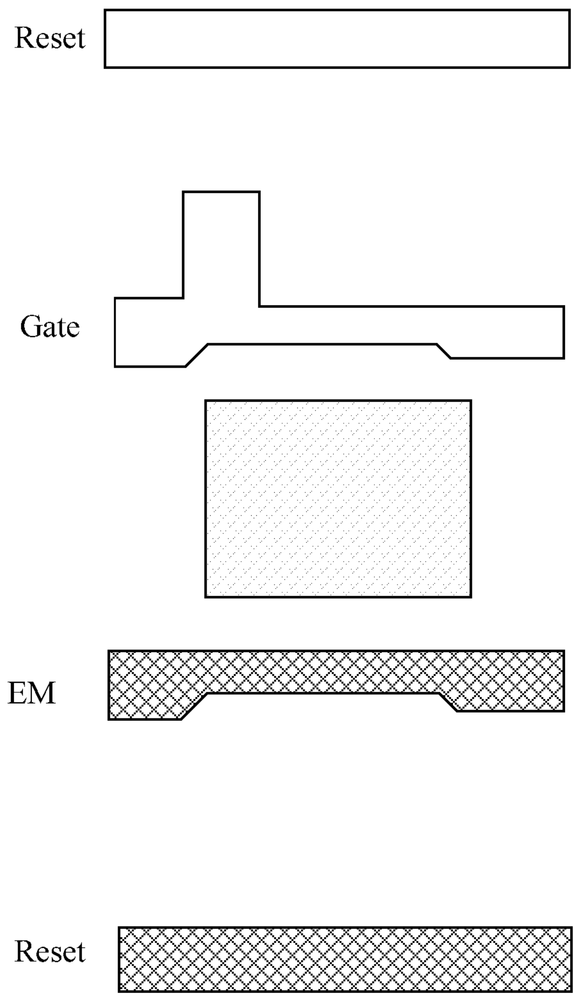
FIG. 14 is a schematic structural diagram of the gate layer in the pixel structure of FIG. 12.
Figure 15:
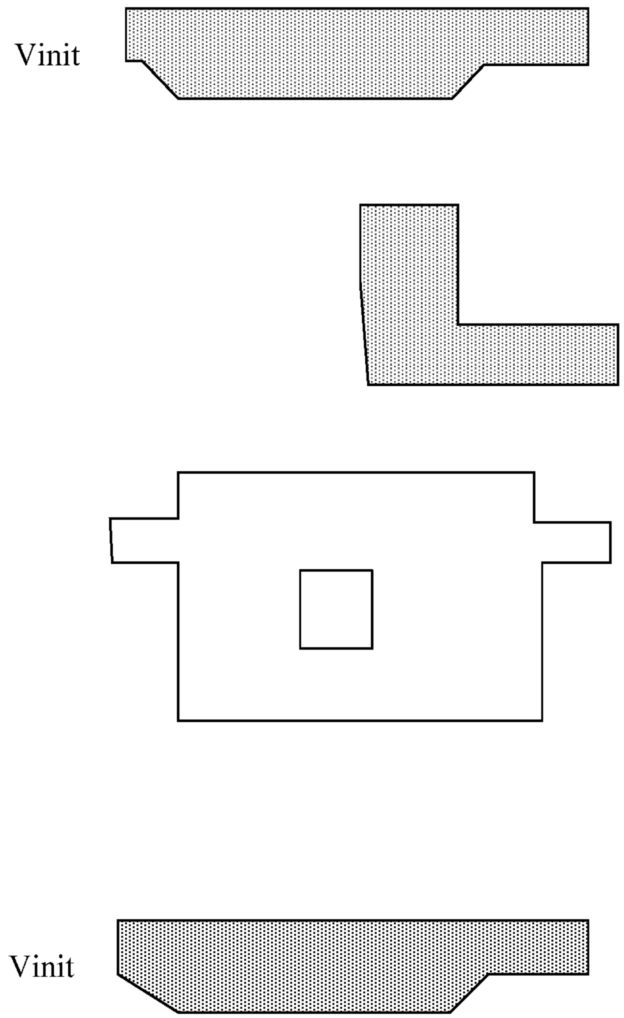
FIG. 15 is a schematic structural diagram of the conductive layer in the pixel structure of FIG. 12.
Figure 16:
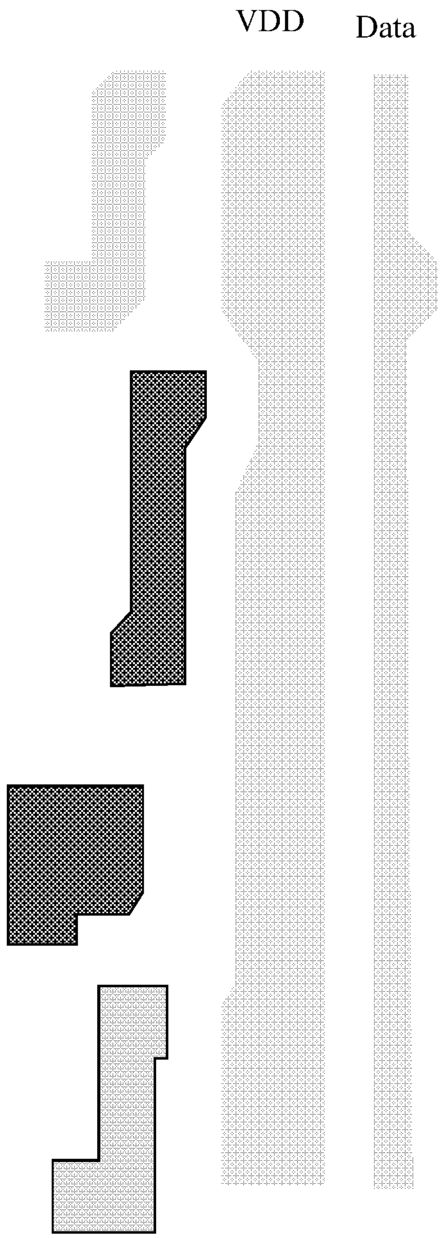
FIG. 16 is a schematic structural diagram of the source-drain layer in the pixel structure of FIG. 12.

In an exemplary embodiment, as shown in FIGS. 12-16, FIG. 12 is a pixel structure corresponding to the pixel driving circuit described in FIG. 1; FIG. 13 is a schematic structural diagram of the active layer in the pixel structure of FIG. 12; FIG. 14 is a schematic structural diagram of the gate layer in the pixel structure of FIG. 12; FIG. 15 is a schematic structural diagram of the conductive layer in the pixel structure of FIG. 12; and FIG. 16 is a schematic structural diagram of the active drain layer in the pixel structure of FIG. 12. The pixel structure shown in FIG. 12 is similar to the pixel structure shown in FIG. 6. The pixel structure also includes an active layer ACT, a gate layer Gate, a conductive layer EC, a source-drain layer SD, an active layer ACT, and a gate layer Gate. The conductive layer EC and the source-drain layer SD are stacked in sequence, and an insulating layer is provided between adjacent film layers. The annotations Gate, Data, Vinit, Reset, VDD, T1, T2, T3, T4, T5, T6, and DT in FIG. 12 correspond to respective ones of the annotations Gate, Data, Vinit, Reset, VDD, T1, T2, T3, T4, T5, T6, and DT in FIG. 1. The black square in FIG. 12 indicates the via hole located on the insulating layer, and the via hole is used to connect the above four film layers. The pixel structure shown in FIG. 12 and the pixel structure shown in FIG. 6 also have the same interlayer connection mode, while the difference is only that the pixel structure shown in FIG. 12 includes one driving transistor, and the pixel structure shown in FIG. 6 includes four driving transistors.

In an exemplary embodiment, the pixel structure in the low pixel density area of the display panel may adopt the pixel structure shown in FIG. 6, and the pixel structure in the high pixel density area of the display panel may adopt the pixel structure shown in FIG. 12. According to the test, the ratio of the light-transmitting area using the pixel structure of FIG. 12 is 32.57% and the transmittance is 9.77%, while the ratio of the light-transmitting area using the pixel structure of FIG. 6 is 30.29%, and the transmittance is 9.09%. This shows that the use of the pixel structure shown in FIG. 6 in the low pixel density area has minimal impact on its transmittance, which can fully satisfy the camera lighting.

In other exemplary embodiments, the pixel density of the high pixel density area may be another multiple of the pixel density of the low pixel density area. For example, the pixel density of the high pixel density area is n times the pixel density of the low pixel density area, and the pixel driving circuit in the high pixel density area has the same architecture as the pixel driving circuit in the low pixel density area. The pixel driving circuit in the high pixel density area includes in driving transistors, and the pixel driving circuit in the low pixel density area includes X driving transistors, where in is a positive integer, and X is a positive integer less than or equal to $n^2m$ and greater than $n^2m-1$, or X is a positive integer greater than or equal to $n^2m$ and less than $n^2m+1$. For example, when m=1 and n=2.5, then $n^2m=6.25$, and X can be 6 or 7. As another example, when m=1 and n=2, then $n^2m=4$, and X is 4. In the high pixel density area, the capacitance value of the capacitor in the pixel driving circuit is p, and in the low pixel density area, the capacitance value of the capacitor in the pixel driving circuit capacitor is $n^2p$. The size of the driving transistors in the high pixel density area and the low pixel density area are the same. Besides, the pixel driving circuit in the high pixel density area and the pixel driving circuit in the low pixel density area have the same structure, which means that the two pixel driving circuits have the same structure except for the different numbers of driving transistors and the different capacitance values, wherein in can be an integer greater than or equal to 1.

The display panel provided by an exemplary embodiment of the present disclosure can be applied to display devices such as mobile phones, VRs, and tablet computers.

Those skilled in the art will easily think of other embodiments of the present disclosure after considering the specification and practicing the content disclosed herein. The present application is intended to cover any variations, uses, or adaptive changes of the present disclosure. These variations, uses, or adaptive changes follow the general principle of the present disclosure and include common knowledge or conventional technical means in the technical field that are not disclosed in the present disclosure. The description and embodiments are only regarded as exemplary, and the true scope and spirit of the present disclosure are indicated by the claims.

It should be understood that the present disclosure is not limited to the precise structure that has been described above and shown in the drawings, and various modifications and changes can be made without departing from its scope. The scope of the present disclosure is limited only by the appended claims.

The invention claimed is:

1. A display panel, comprising a display area, wherein the display area comprises a low pixel density area and a high pixel density area, and the low pixel density area is provided with a pixel driving circuit, wherein the pixel driving circuit comprises:

a plurality of driving transistors, wherein each driving transistor has a first terminal connected to a first power terminal, a second terminal connected to a first node, and a control terminal connected to a second node, and is configured to input current to the first node under the effect of a voltage at the second node, wherein a pixel density of the high pixel density area is n times a pixel density of the low pixel density area, and the pixel driving circuit in the high pixel density area has the same architecture as the pixel driving circuit in the low pixel density area;

the pixel driving circuit in the high pixel density area comprises m driving transistors, and the pixel driving circuit in the low pixel density area comprises X driving transistors, where m is a positive integer, and X is a positive integer less than or equal to $n^2m$ and greater than $n^2m-1$, or X is a positive integer greater than or equal to $n^2m$ and less than $n^2m+1$;

in the high pixel density area, a capacitor in the pixel driving circuit has a capacitance value of p, and in the low pixel density area, a capacitor in the pixel driving circuit capacitor has a capacitance value of $n^2p$; and the driving transistor in the high pixel density area has the same size as the driving transistor in the low pixel density area.

2. The display panel according to claim 1, wherein in the high pixel density area, the pixel driving circuit comprises a driving transistor.

3. The display panel according to claim 1, wherein the pixel driving circuit further comprises:

a first switch circuit, connected to the first power terminal, the first terminal of each driving transistor, and an enable signal terminal, and configured to achieve conduction between the first power terminal and the first terminal of each driving transistor in response to a signal at the enable signal terminal;

a data writing circuit, connected to the first terminal of each driving transistor, a data signal terminal, and a gate signal terminal, and configured to transmit a signal at the data signal terminal to the first terminal of each driving transistor in response to a signal at the gate signal terminal;

a compensation circuit, connected to the first node, the second node, and the gate signal terminal, and configured to achieve conduction between the first node and the second node in response to the signal at the gate signal terminal;

a second switch circuit, connected to the first node, the enable signal terminal, and a third node, and configured to transmit a signal at the first node to the third node in response to the signal at the enable signal terminal;

a storage circuit, connected between the second node and the first power terminal, and configured to store a voltage at the first node;

a first reset circuit, connected to the second node, an initial signal terminal, and a reset signal terminal, and configured to transmit a signal at the initial signal terminal to the second node in response to a signal at the reset signal terminal;

a second reset circuit, connected to the third node, the initial signal terminal, and the reset signal terminal, and configured to transmit the signal at the initial signal terminal to the third node in response to the signal at the reset signal terminal; and a light-emitting unit, connected between the third node and the second power terminal.

4. The display panel according to claim 3, wherein the first switch circuit comprises:

a first transistor, having a first terminal connected to the first power terminal, a second terminal connected to the first terminal of each driving transistor, and a control terminal connected to the enable signal terminal;

the data writing circuit comprises:

a second transistor, having a first terminal connected to the data signal terminal, a second terminal connected to the first terminal of each driving transistor, and a control terminal connected to the gate signal terminal;

the compensation circuit comprises:

a third transistor, having a first terminal connected to the first node, a second terminal connected to the second node, and a control terminal connected to the gate signal terminal;

the second switch circuit comprises:

a fourth transistor, having a first terminal connected to the first node, a second terminal connected to the third node, and a control terminal connected to the enable signal terminal;

the storage circuit comprises:

a capacitor, connected between the second node and the first power terminal;

the first reset circuit comprises:

a fifth transistor, having a first terminal connected to the second node, a second terminal connected to the initial signal terminal, and a control terminal connected to the reset signal terminal;

the second reset circuit comprises:

a sixth transistor, having a first terminal connected to the third node, a second terminal connected to the initial signal terminal, and a control terminal connected to the reset signal terminal; and the light-emitting unit comprises:

a light emitting diode, connected between the third node and the second power terminal.

5. The display panel according to claim 1, wherein the pixel driving circuit further comprises:

a seventh transistor, having a first terminal connected to the data signal terminal, a second terminal connected to the second node, and a control terminal connected to the first gate signal terminal;

an eighth transistor, having a first terminal connected to a sensing signal terminal, a second terminal connected to the first node, and a control terminal connected to a second gate signal terminal;

a capacitor, connected between the first node and the second node; and a light-emitting unit, connected between the first node and the second power terminal.

6. The display panel according to claim 1, wherein the pixel driving circuit comprises a capacitor, each driving transistor comprises a gate portion, and a plurality of the gate portions form an electrode of the capacitor.

7. The display panel according to claim 6, further comprising:

a gate layer, a source-drain layer, and a conductive layer, located between the gate layer and the source-drain layer, wherein a part of the conductive layer forms another electrode of the capacitor.

8. The display panel according to claim 1, further comprising a data line, wherein the data line extends along a first direction;

and the plurality of driving transistors are sequentially arranged in parallel along the first direction.

* * * * *